United States Patent [19]

Mazaki et al.

[11] Patent Number: 4,576,990

[45] Date of Patent: Mar. 18, 1986

[54] WATER-SOLUBLE INSULATING VARNISH

[75] Inventors: Shiro Mazaki; Hiroshi Shibata, both of Osaka, Japan

[73] Assignee: Nitto Electric Industrial Co., Ltd., Osaka, Japan

[21] Appl. No.: 671,841

[22] Filed: Nov. 15, 1984

[51] Int. Cl.$^{4}$ ....................... C08L 77/00; C08L 79/00

[52] U.S. Cl. .................................... 524/602; 525/444; 525/448; 528/288; 528/291; 528/486; 528/492

[58] Field of Search ................ 524/602; 525/444, 448; 528/288, 291, 486, 492

[56] References Cited

U.S. PATENT DOCUMENTS

| | | | |
|---|---|---|---|
| 4,008,195 | 2/1977 | Ishizuka et al. | 525/448 X |
| 4,066,593 | 1/1978 | Czajka et al. | 524/602 X |
| 4,104,221 | 8/1978 | Janssen et al. | 528/291 X |
| 4,116,941 | 9/1978 | Hanson | 528/288 X |
| 4,130,520 | 12/1978 | Thomas et al. | 525/448 X |
| 4,375,528 | 3/1983 | Lange | 524/602 X |
| 4,429,072 | 1/1984 | Reiter et al. | 528/288 X |
| 4,439,579 | 3/1984 | Reiter et al. | 524/602 |

*Primary Examiner*—Lucille M. Phynes

*Attorney, Agent, or Firm*—Sughrue, Mion, Zinn, Macpeak and Seas

[57] ABSTRACT

An insulating varnish comprising water-soluble polyesters and which can be used as an enamel or protective coating for electric wires is disclosed. The insulating varnish is prepared by reacting an aromatic dicarboxylic acid component and a polyhydric alcohol component to produce a high molecular weight polyester resin, addition reacting a polybasic acid with the resulting polyester resin to obtain a carboxyl group-containing polyester resin and dissolving the resulting polyester resin in water using a basic compound.

14 Claims, No Drawings

WATER-SOLUBLE INSULATING VARNISH

FIELD OF THE INVENTION

The present invention relates to an insulating varnish comprising water-soluble polyesters, which can be used as an enamel or protective coating for electric wires.

BACKGROUND OF THE INVENTION

Electric wires produced by coating with polyester-based insulating varnishes followed by baking are widely used in general or domestic electric appliances because of their excellent electrical insulation properties, heat resistance and mechanical properties. Since, however, such polyester-based insulating varnishes have a high molecular weight and are hydrophobic, they are usually dissolved in phenol- or cresol-based organic solvents which are expensive and harmful. Attempts have heretofore been made to make polyester resins water-soluble.

One of them is a procedure in which polyvalent (at least trivalent) carboxylic acid is incorporated into the main chain as a water-soluble portion. This method, however, causes plasticization of the main chain, thereby not only reducing thermal and mechanical characteristics, but also bringing a disadvantage that the resulting polyester resin gels before its molecular weight reaches a certain level at which it exhibits characteristics sufficiently comparable to those of solvent-type polyester-based insulating varnishes, because of the equivalency in reactivity of the carboxyl group.

Another procedure is to sufficiently increase the OH/COOH ratio and limit the molecular weight to a certain extent so that the skeleton of the resin is rendered water-soluble before it becomes hydrophobic. In this case, however, the resulting polyester-based varnish provides an insulating coating which is inferior in thermal and mechanical properties to that of the organic solvent-type polyester-based insulating varnishes, because of its low molecular weight.

SUMMARY OF THE INVENTION

As a result of extensive investigations, it has been found that above-described problems can be overcome by a novel technique that a polyester resin is first prepared which is substantially equivalent to an organic solvent-type polyester and the polyester resin is rendered water-soluble by adding a polybasic acid containing a single anhydride group to a side or terminal hydroxyl group of the resin to form a free carboxyl group.

Accordingly, an object of the present invention is to provide a water-soluble insulating varnish which is prepared by

- reacting an aromatic dicarboxylic acid component and a polyhydric alcohol component containing at least 30 mol% of an alcohol having 3 or more hydroxyl groups in the amounts such that the ratio of the hydroxyl group to the carboxyl group is from 1.2:1 to 1.8:1 to produce a high molecular weight polyester resin;
- addition reacting a polybasic acid containing a single anhydride group in the molecule with the polyester resin to obtain a carboxyl group-containing polyester resin; and
- dissolving the carboxyl group-containing polyester resin in water using a basic compound.

DETAILED DESCRIPTION OF THE INVENTION

The high molecular weight polyester resin can be produced from conventional starting materials and by conventional procedures.

Examples of the aromatic dicarboxylic acid component include terephthalic acid, isophthalic acid, hexahydrophthalic anhydride and mixtures thereof.

Examples of the polyhydric alcohol component include alcohols having three or more hydroxyl groups such as pentaerythritol, glycerin, trimethylolpropane and tris-2-hydroxyethyl isocyanurate and dihydride alcohols such as ethylene glycol, propylene glycol and 1,4-butylene alcohol.

The water-soluble insulating varnish of the present invention is materially different from the conventional organic solvent-type polyester-based insulating varnishes.

In the organic solvent-type polyester-based insulating varnishes, polyester varnishes not containing any alcohols having three or more hydroxyl group can be produced. On the other hand, the high molecular weight polyester resin used in the present invention must be produced using a polyhydric alcohol component containing at least 30 mol%, preferably at least 40 mol%, of an alcohol having 3 or more, preferably 3 to 5, hydroxyl groups. If the proportion of the alcohol having 3 or more hydroxyl groups in the polyhydric alcohol component is less than 30 mol%, an insulating varnish having a high molecular weight and which can be made soluble in water cannot be obtained.

The high molecular weight polyester resin usually has a weight average molecular weight of from about 3,000 to 20,000 and a very low acid value of from 0 to 5 and it is quite difficult to render the resin water-soluble without cutting the polymer chain.

Such a substantially water-insoluble high molecular weight polyester resin is modified with polybasic acids containing a single anhydride group in order to render it water-soluble.

Examples of these polybasic acids include phthalic anhydride, 3,6-endomethylene-$\Delta^4$-tetrahydrophthalic anhydride, methyl-3,6-endomethylene-$\Delta^4$-tetrahydrophthalic anhydride, succinic anhydride, maleic anhydride, trimellitic anhydride, itaconic anhydride, butanetetracarboxylic monoanhydride, and mixtures thereof.

Use of polyvalent carboxylic acids not containing any anhydride group or polyvalent carboxylic acids containing a plurality of anhydride groups in the molecule is difficult to produce a desired water-soluble composition, since in each case, the reactivity of the carboxylic groups or acid anhydride groups present therein is nearly equivalent, a net-work structure is formed and gelation occurs.

The water-soluble insulating varnish of the present invention can be prepared as follows.

An aromatic dicarboxylic acid component and a polyhydric alcohol component containing a polyhydric alcohol having 3 or more hydroxyl groups, the proportion of the polyhydric alcohol in the polyhydric alcohol component being at least 30 mol%, are reacted in such a condition that the polyhydric alcohol component is present excessively. In this case, the equivalent ratio of alcohol to acid (OH/COOH) is from 1.2:1 to 1.8:1, preferably from 1.2:1 to 1.5:1. The acid component and the alcohol component are reacted at a temperature of from 100° to 300° C., preferably from 180° to 240° C., for from 10 to 15 hours. Water is formed and the reaction mixture becomes gradually a viscous resin material. The acid value of this resin material is from 10 to 20, the softening point as determined by the ring and ball method is from 70° to 80° C., and the weight average molecular weight is from 1,000 to 2,000.

In order to further increase the molecular weight, the reaction is continued at a temperature of from 200° to 240° C. under a reduced pressure of from 700 to 740 mmHg for from 1 to several hours (e.g., about 3 hours) to obtain a high molecular weight polyester resin having an acid value of 5 or less, a softening point of from 90° to 110° C., and a weight average molecular weight of from 3,000 to 20,000 which can be used in the present invention. The hydroxyl value of the polyester resin as determined by the acetylene method is from about 150 to 300.

The reaction system is cooled to from 100° to 130° C., and a given amount of a polybasic acid containing a single acid anhydride group in the molecule is added thereto so as to add the polybasic acid to at least 20% of the hydroxyl groups contained in the polyester resin. The mixture is reacted for from 2 to 4 hours at the above temperature (100° to 130° C.) to obtain a carboxyl group-containing polyester resin. By this reaction, the anhydride group is opened to react with a side or terminal hydroxyl group of the polyester resin, thereby providing a polyester resin containing a free carboxylic group at the side or terminal thereof. Theoretically, the above reaction proceeds at temperatures lower than 100° C. but the resulting resin has a high viscosity, which is unsuitable for practical use. On the other hand, if the reaction temperature is higher than 130° C., there is the possibility that the carboxyl group further reacts with a hydroxy group, causing net-work gelation.

When, even within the above-described temperature range, the molecular weight is so high that the viscosity of the reaction system is abnormally high and the reaction is difficult to proceed, suitable amounts of diluents which are unreactive with the anhydride group and miscible with water may be used.

Examples of the diluent which can be used in the present invention include ethylene glycol monomethyl ether acetate, ethylene glycol monoethyl ether acetate, diethylene glycol monomethyl ether acetate, diethylene glycol monoethyl ether acetate, ethylene glycol dimethyl ether and ethylene glycol diethyl ether.

By adding water with basic compounds such as ammonia dissolved therein to the carboxyl group-containing polyester resin, the carboxyl group fixed appropriately in the polyester resin is neutralized to obtain a water-soluble insulating varnish. When the water-soluble insulating varnish is applied and baked, the basic compound such as ammonia is evaporated and intra or inter-molecular cross-linking proceeds, resulting in the formation of a coating having excellent insulation properties.

Examples of the basic compounds which are added to the carboxyl group-containing polyester resin water-soluble include, as well as ammonia, trialkylamines such as triethylamine, N-alkyldiethanolamines such as N-methyldiethanolamine, N,N-dialkylethanolamine such as N,N-dimethylethanolamine, monoethanolamine, diethanolamine, triethanolamine, and mixtures thereof.

The basic compound is added in an amount sufficient to render the carboxyl group-containing polyester resin water-soluble. In the case of ammonia and ammonia water, for example, even if they are added in excess, the surplus can be removed by heating the varnish at about 100° C. The conventional organic solvent-type varnishes cannot provide a coating having sufficiently satisfactory characteristics unless organometallic compounds (e.g., tetrabutyl titanate) are added as cross-linking agents at the time of baking. On the other hand, the varnish of the present invention can provide a coating having sufficiently satisfactory characteristics without the use of such cross-linking agents. This is one of the features of the present invention. In some cases, however, it is effective to add, as cross-linking agents, water-soluble compounds such as water-soluble organometallic compounds, water-soluble phenol resins, water-soluble epoxy resins, water-soluble amino resins and hexamethoxymethylated melamines.

The water-soluble insulating varnish of the present invention is useful as a baking varnish, particularly as an electric wire enamel for coating of conductive materials. In addition, the varnish is useful as an insulating material for flexible print substances (which are produced by coating the varnish on a conductive foil followed by baking), surface heat generators and tape cables.

In some cases, the varnish of the present invention can be applied for coating of transportation machines such as cars, ships and airplanes; domestic electric appliances such as refrigerators and washing machines; and so forth. The varnish of the present invention can be applied as an undercoating or topcoating varnish for other varnishes. The varnish of the present invention, when applied on conductive materials by electrophoresis, for example, and then baked, provides a useful coating.

The present invention is described in greater detail by reference to the following examples, but the present invention is not limited thereto. Unless otherwise indicated, all percents, parts, ratios and the like are by weight.

EXAMPLE 1

A 1-liter four-necked flask equipped with rectification column with a water measurable trap, a thermometer, a dropping funnel, and a stirrer was charged with 166 g (1.0 mol) of terephthalic acid, 37.2 g (0.6 mol) of ethylene glycol, 46 g (0.5 mol) of glycerin and 0.07 g of dibutyl tin dilaurate (catalyst for esterification), and the mixture was heated while stirring. When the temperature was raised to near 180° C. over 30 minutes, water was distilled away. The temperature was further raised from 180° C. to 230° C. over 5 hours, and when the reaction mixture was reacted at 230° C. for additional 6 hours, about 36 g of water was distilled away and a colorless transparent resin was obtained. This resin had an acid value of 12.6 and a softening point of 73° C. The reaction was further continued at this temperature under a reduced pressure of 720 mmHg for 3 hours and when the acid value of the resin and the softening point reached 2.6 and 98° C., respectively, the pressure was returned to atmospheric pressure and the temperature was lowered to 115° C. The thus-produced high molecular weight polyester resin had a hydroxyl group value of 215. 41 g of succinic anhydride was then added to the polyester resin at 115° C. and the mixture was reacted for 3 hours to produce a carboxylic group-containing polyester resin (acid value: 91).

To this carboxyl group-containing polyester resin was added 25 g of industrial ammonia water diluted with 300 g of water through the dropping funnel. By stirring the mixture at 100° C. for 30 minutes, an excess of ammonia was evaporated and a light yellow, transparent water-soluble insulating varnish was obtained. The varnish had a viscosity of 26 poises and a nonvolatile content of 43.6%.

EXAMPLE 2

A 1-liter four-necked flash equipped with rectification column with a water measurable trap, a thermometer, a dropping funnel, and a stirrer was charged with 166 g (1.0 mol) of terephthalic acid, 37.2 g (0.6 mol) of ethylene glycol, 130.5 g (0.5 mol) of tris-2-hydroxyethylisocyanurate, and 0.07 g of dibutyl tin oxide (catalyst for esterification), and the mixture was heated while stirring. When the temperature was raised to near 180° C. over 30 minutes, water was distilled away. The temperature was raised from 180° C. to 230° C. over 7 hours and when the above reaction mixture was further reacted at 230° C. for additional 5 hours, about 36 g of water was distilled away and a colorless, transparent resin was obtained. The reaction was further continued at this temperature under a reduced pressure of 720 mmHg for 2 hours and when the acid value of the resin and the softening point reduced 3.5 and 95° C., respectively, the pressure was returned to atmospheric pressure and the temperature was lowered to 110° C. To the thus-produced high molecular weight polyester resin was added 22.2 g of phthalic anhydride and 32.4 g of butanetetracarboxylic monoanhydride, and the mixture was reacted for 3 hours to obtain a carboxyl group-containing polyester resin having an acid value of 100. To this carboxyl group-containing polyester resin, 40 g of industrial ammonia water diluted with 300 g of water was added through the dropping funnel. By stirring the resulting mixture at 100° C. for 30 minutes, an excess of ammonia was evaporated and a light yellow, transparent water-soluble insulating varnish was obtained. This varnish had a viscosity of 62 poises and a nonvolatile content of 48.5%.

EXAMPLE 3

A 1-liter four-necked flask equipped with rectification column with a water measurable trap, a thermometer, a dropping funnel, and a stirrer was charged with 124.5 g (0.75 mol) of terephthalic acid, 41.5 g (0.25 mol) of isophthalic acid, 49.6 g (0.8 mol) of ethylene glycol, 53.6 g (0.4 mol) of trimethylolpropane and 0.07 g of dibutyl tin laurate (catalyst), and the mixture was heated while stirring. When the temperature was raised to 180° C. over 30 minutes, water was distilled away. The temperature was then raised from 180° C. to 220° C. over 8 hours, and the above reaction mixture was further reacted at 220° C. for additional 4 hours. About 36 g of water was distilled away and a colorless, transparent resin was obtained. The reaction was further continued at this temperature under a reduced pressure of 720 mmHg for 2 hours and when the acid value of the resin and the softening point reached 2.1 and 105° C., respectively, the pressure was returned to atmospheric pressure and the temperature was lowered to 130° C. To the thus-produced high molecular weight polyester resin was added 30 g of cellosolve acetate (ethylene glycol monoethyl ether acetate), because the viscosity of the polyester resin was too high. 19.6 g of maleic anhydride was then added at 110° C., and the mixture was reacted for 2 hours to produce a carboxyl group-containing polyester resin (acid value: 50). To this carboxyl group-containing polyester resin, 15 g of ammonia water diluted with 300 g of water was added through the dropping funnel. By stirring the resulting mixture at 100° C. for 30 minutes, an excess of ammonia was evaporated and a colorless, transparent water-soluble insulating varnish as obtained. To this varnish was added 15 g of a water-soluble titanium compound (trade name: MC-5000; produced by Matsumoto Seiyaku Co., Ltd.).

EXAMPLE 4

A 1-liter four-necked flask equipped with rectification column with a water measurable trap, a thermometer, a dropping funnel, and a stirrer was charged with 166 g (1.0 mol) of terephthalic acid, 110.4 g (1.2 mol) of glycerin and 0.07 g of dibutyl tin oxide (catalyst), and the mixture was heated while stirring. When the temperature was raised to 180° C. over 30 minutes, water was distilled away. The temperature was then raised from 180° C. to 220° C. over 10 hours, and when the above reaction mixture was further reacted at 220° C. for 2 hours, about 34.5 g of water was distilled away and a colorless, transparent resin was obtained. The reaction was further continued at this temperature under a reduced pressure of 720 mmHg for 2 hours and when the acid value of the resin and the softening point reached 4.5 and 98° C., respectively, the pressure was returned to atmospheric pressure and the temperature was lowered to 110° C. To the thus-produced high molecular weight polyester resin was added 30 g of succinic anhydride, and the mixture was reacted for 2 hours to produce a carboxyl group-containing polyester resin (acid value: 65). To this carboxyl group-containing polyester resin, 20 g of industrial ammonia water diluted with 300 g of water was added through the dropping funnel. By stirring the resulting mixture at 100° C. for 30 minutes, an excess of ammonia was evaporated and a light yellow, transparent water-soluble insulating varnish was obtained. This varnish had a viscosity of 46 poises and a non-volatile content of 44.0%.

The water-soluble insulating varnishes as produced in Examples 1 to 4 and a comparative solvent-type polyester based varnish, DERACOAT E-220 G (tradename, produced by Nitto Electric Industrial Co., Ltd.) each was coated on a soft copper wire having a diameter of 1.0 mm in a vertical furnace having a furnace length of 3.0 m at a temperature of 400° C. and a coating speed of 6.5 m/min and then baked to produce an electric wire. The charcteristics of the electric wires are shown in Table 1.

The characteristics were measured according to JIS C3210 (polyester copper wire testing method).

TABLE 1

| | Example No. | | | | Comparative |
|---|---|---|---|---|---|
| | 1 | 2 | 3 | 4 | Example |
| Structure of Electric Wire | | | | | |
| Coated Wire Diameter (mm) | 1.075 | 1.073 | 1.073 | 1.075 | 1.075 |
| Bare Wire Diameter (mm) | 0.095 | 0.995 | 0.995 | 0.995 | 0.995 |
| Film Thickness (mm) | 0.040 | 0.039 | 0.039 | 0.040 | 0.040 |
| Winding Properties | | | | | |

TABLE 1-continued

| | Example No. | | | | Comparative |
|---|---|---|---|---|---|
| | 1 | 2 | 3 | 4 | Example |
| 1 Diameter in Ordinary Condition | good | good | good | good | good |
| 1 Diameter After 20% Pre-Stretching | good | good | good | good at 2 diameter | good |
| After Heat Aging at 200° C. for 6 hours | good at 1 diameter | good at 1 diameter | good at 1 diameter | good at 1 diameter | good at 2 diameter |
| Abrasion Resistance (Repeated Abrasion) 600 g load | 52 | 48 | 61 | 57 | 46 |
| Heat Softening Temperature (°C.) 2 kg load, 2° C./min. | 346 | 372 | 321 | 383 | 336 |
| Heat Shock Resistance 180° C. × 1 hour | good at 3 diameter | good at 2 diameter | good at 3 diameter | good at 4 diameter | good at 3 diameter |
| Dielectric Strength (twisted pair) (KV) | 13.2 | 14.0 | 13.6 | 13.1 | 13.5 |
| Chemical Resistance (Pencil Hardness) | | | | | |
| Pencil Hardness in Ordinary Condition | 4H | 5H | 4H | 5H | 4H |
| After Dipping in 1% Caustic Soda | 4H | 5H | 4H | 5H | 4H |
| After Dipping in Sulfuric Acid (SG = 1.2) | 4H | 5H | 4H | 5H | 4H |

Since, as described above, the insulating varnish of the present invention uses water as a medium, it is inexpensive and, furthermore, is free from air pollution due to the scattering of solvents or harmful gases at the time of baking and also from a danger of fire or explosion, and the operation condition is good.

The insulating varnish of the present invention provides a baked coating having the electrical, mechanical and thermal characteristics comparable to those of the conventional solvent-type varnishes.

While the invention has been described in detail and with reference to specific embodiments thereof, it will be apparent to one skilled in the art that various changes and modifications can be made therein without departing from the spirit and scope thereof.

What is claimed is:

1. A water-soluble insulating varnish which is prepared by
   - reacting an aromatic dicarboxylic acid component and a polyhydric alcohol component containing at least 30 mol% of an alcohol having 3 or more hydroxy groups in the amounts such that the ratio of the hydroxyl group to the carboxyl group is from 1.2:1 to 1.8:1 to produce a high molecular weight polyester resin;
   - addition reacting a polybasic acid containing a single anhydride group in the molecule with the polyester resin to obtain a carboxyl group-containing polyester resin; and
   - dissolving the carboxyl group-containing polyester resin in water using a basic compound.

2. The water-soluble insulating varnish of claim 1, wherein the aromatic dicarboxylic acid is selected from the group consisting of terephthalic acid, isophthalic acid, hexahydrophthalic anhydride and mixtures thereof.

3. The water-soluble insulating varnish of claim 1, wherein the alcohol having 3 or more hydroxyl groups is selected from the group consisting of pentaerythritol, glycerin, trimethylopropane, tris-2-hydroxyethyl isocyanurate and mixtures thereof.

4. The water-soluble insulating of claim 1, wherein the reaction of the aromatic dicarboxylic acid and the polyhydric alcohol is conducted at 100° to 300° C. for 10 to 15 hours and then at 200° to 240° C. under a reduced pressure of 700 to 740 mmHg for 1 to about 3 hours.

5. The water-soluble insulating varnish of claim 1, wherein the high molecular weight polyester resin has an acid value of 5 or less, a softening point of 90° to 100° C. and a weight average molecular weight of 3,000 to 20,000.

6. The water-soluble insulating varnish of claim 1, wherein the polybasic acid containing a single anhydride group in the molecule is selected from the group consisting of phthalic anhydride, 3,6-endomethylene-$\Delta^4$-tetrahydrophthalic anhydride, methyl-3,6-endomethylene-$\Delta^4$-tetrahydrophthalic anhydride, succinic anhydride, maleic anhydride, trimellitic anhydride, itaconic anhydride, butanetetracarboxylic monohydride and mixtures thereof.

7. The water-soluble insulating varnish of claim 1, wherein the addition reaction of the polyester resin and the polybasic acid is conducted at 100° to 130° C. for 2 to 4 hours.

8. The water-soluble insulating varnish of claim 1, wherein the polybasic acid is addition reacted to at least 20% of hydroxyl groups in the high molecular weight polyester resin.

9. The water-soluble insulating varnish of claim 1, wherein the basic compound is selected from the group consisting of ammonia, trialkylamine, N-alkyldiethanolamine, N-N-dialkylethanolamine, monoethanolamine, diethanolamine, triethanolamine and mixtures thereof.

10. The water-soluble insulating varnish of claim 1, wherein the high molecular weight polyester resin has a weight average molecular weight of 3,000 to 20,000.

11. The water-soluble insulating varnish of claim 10, wherein the polyhydric alcohol component contains at least 40 mole% of the alcohol having 3 or more hydroxyl groups.

12. The water-soluble insulating varnish of claim 11, wherein the alcohol has 3 to 5 hydroxyl groups.

13. The water-soluble insulating varnish of claim 12, wherein the ratio of the hydroxyl group to the carboxyl group is from 1.2:1 to 1.5:1.

14. The water-soluble insulating varnish of claim 13, wherein the hydroxyl value of the polyester resin is determined by the acetylene method is from about 150 to 300.

* * * * *